United States Patent
Hall et al.

(10) Patent No.: US 12,354,015 B2
(45) Date of Patent: Jul. 8, 2025

(54) PROCESSING OF NEURAL NETWORKS

(71) Applicant: Arm Limited, Cambridge (GB)

(72) Inventors: Philip Gregory Hall, Bracknell (GB); Jacob Bohlin, Lund (SE)

(73) Assignee: Arm Limited, Cambridge (GB)

( * ) Notice: Subject to any disclaimer, the term of this patent is extended or adjusted under 35 U.S.C. 154(b) by 969 days.

(21) Appl. No.: 17/473,616

(22) Filed: Sep. 13, 2021

(65) Prior Publication Data
US 2022/0383133 A1    Dec. 1, 2022

Related U.S. Application Data

(60) Provisional application No. 63/194,003, filed on May 27, 2021.

(51) Int. Cl.
*G06N 3/10* (2006.01)
(52) U.S. Cl.
CPC ..................... *G06N 3/10* (2013.01)
(58) Field of Classification Search
CPC ....................................... G06N 3/10
See application file for complete search history.

(56) References Cited

U.S. PATENT DOCUMENTS

2022/0043688 A1* 2/2022 Lai ........................... G06F 17/10
2022/0222521 A1* 7/2022 Wagner .................... G06N 3/04

OTHER PUBLICATIONS

Jin et al. (Split-CNN: Splitting Window-based Operations in Convolutional Neural Networks for Memory System Optimization, ASPLOS '19, Published: Apr. 4, 2019, pp. 835-847). (Year: 2019).*
Gomez et al. (The Reversible Residual Network: Backpropagation Without Storing Activations, NIPS 2017), Published: 2017, pp. 1-11). (Year: 2017).*
Beaumont et al. (Optimal checkpointing for heterogeneous chains: how to train deep neural networks with limited memory, arXiv, Published: 2019, pp. 1-30). (Year: 2019).*
Kirisame et al. (Dynamic Tensor Rematerialization, arXiv, Published: Mar. 18, 2021, pp. 1-31). (Year: 2021).*
Thielke et al. (A JIT Compiler for Neural Network Inference, arXiv), Published: 2019, pp. 1-8). (Year: 2019).*

* cited by examiner

*Primary Examiner* — Tan H Tran
(74) *Attorney, Agent, or Firm* — EIP US LLP

(57) ABSTRACT

A method reduces storage usage during processing of a neural network performed by an information processing apparatus comprising a storage. The network may be represented by operators that operate on an input feature map and generate an output feature map. A representation of the network is generated as a linear sequence of operators. Operators are identified in the sequence that cannot form part of a cascade and are to be processed with the entire input and output feature map of the respective operator in the storage. The method forms one or more cascades of two or more successive operators in the sequence for which the input feature map of each operator of the cascade is processed in portions, which portions are less than the entire input feature map. The method forms the one or more cascades by sequentially, from one end of the sequence of operators, designating each operator that could form part of a cascade as a member of a cascade or as an operator to be processed with the entire input and output feature map of the operator in the storage.

15 Claims, 12 Drawing Sheets

PROCESSING OF NEURAL NETWORKS

CROSS-REFERENCE TO RELATED APPLICATIONS

This application claims the benefit of U.S. Provisional Patent Application No. 63/194,003, filed May 27, 2021, which is incorporated by reference herein in its entirety.

BACKGROUND

Field of the Invention

The present invention relates to processing of neural networks.

Description of the Related Technology

Neural networks are being used in many applications from face detection to weather forecasting. A neural network is an algorithm that takes an input data at an input layer and generates one or more output values in an output layer. In between, the input data is operated on by one or more neural network operators.

Neural network operators generate an output feature map (OFM) by operating on an input feature map (IFM). The input feature map need not be the original input data but may be output feature map data of a preceding hidden layer in the neural network. These OFMs do not need to be generated in their entirety in one pass and instead can be generated in smaller units, dictated by the kernel-size of the neural network operator. The subdivisions of an input feature map may be horizontal or vertical stripes.

Processors that process neural networks have limited memory capacity and may have to share memory used for processing a neural network with other processes and possibly other hardware. In view of this, it may be desirable to be able to identify how to process a neural network without making excessive use of memory resources.

SUMMARY

According to a first aspect there is provided a method for reducing storage usage during processing of a neural network performed by an information processing apparatus comprising a storage, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the storage.

According to a second aspect there is provided an information processing apparatus comprising: a processor; and a first storage storing instructions for performing a method for reducing storage usage of a second storage during processing of a neural network performed by the information processing apparatus, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the second storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the second storage.

According to a third aspect there is provided a non-transitory computer readable storage medium storing instructions, that when executed by a processor, cause the processor to perform a method for reducing storage usage during processing of a neural network, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the storage.

BRIEF DESCRIPTION OF THE DRAWINGS

Embodiments will now be described with reference to the accompanying figures in which.

DETAILED DESCRIPTION

Figure 1:
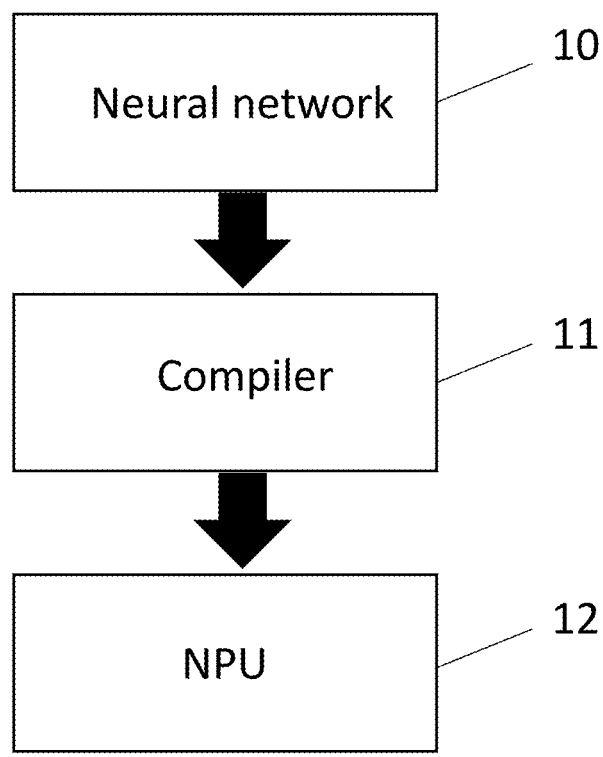
FIG. 1 is a schematic diagram showing stages of processing of a neural network.

Before discussing particular embodiments with reference to the accompanying figures, the following description of embodiments is provided.

A first embodiment provides a method for reducing storage usage during processing of a neural network performed by an information processing apparatus comprising a storage, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the storage.

In some embodiments, the size of the feature map data that will be stored when processing a cascade may be determined based on a size of an input feature map for the first operator in the cascade, sizes of intermediate feature maps for any subsequent operators in the cascade that are not the last operator in the cascade, and a size of an output feature map for the last operator in the cascade.

In some embodiments, the method may form the one or more cascades by sequentially, from an output end of the linear sequence of operators, designating each operator that could form part of a cascade as a member of a cascade or as an operator to be processed with the entire input feature map and output feature map of the operator in the storage.

In the first embodiment, designating an operator may include comparing a size of feature map data that will be stored in the storage when processing a cascade including the operator being designated with a maximum size of feature map data of one or more other cascades.

In a case that the size of feature map data that will be stored when processing a cascade including an operator being designated is greater than or equal to a maximum size of feature map data of one or more other cascades, the method may reduce a number of operators in the current cascade in order to keep the memory size below the maximum size of feature map data of another cascade of the one or more cascades. In such a method, the method may comprise reducing the size of the current cascade by at least one of: removing an operator from the cascade and designating the removed operator to be processed with the entire input feature map and output feature map of the removed operator in the storage, and splitting the cascade into two or more cascades.

In a case that the size of feature map data that will be stored when processing a cascade including an operator being designated is greater than or equal to a maximum size of feature map data of one or more other cascades, the method may determine whether there exists an operator within the cascade that can run without forming part of a cascade using feature map data having a size less than or equal to a maximum size of feature map data of one or more other cascades.

The method may comprise determining whether or not the operator to being designated can to be processed with the entire input feature map and output feature map of the operator in the storage within a maximum size of feature map data that will be stored during processing by operators that cannot form part of a cascade and are to be processed with the entire input feature map and output feature map of the respective operator in the storage.

In a case where the operator being designated can be processed with the entire input feature map and output feature map of the operator in the storage within the maximum size of feature map data that will be stored during processing by operators that cannot form part of a cascade and are to be processed with the entire input feature map and output feature map of the respective operator in the storage, the operator may be designated to run uncascaded.

In some embodiments, the method may form the one or more cascades by sequentially, from an input end of the linear sequence of operators, designating each operator that could form part of a cascade as a member of a cascade or as an operator to be processed with the entire input feature map and output feature map of the operator in the storage.

The method may comprise determining a first condition of whether an operator being designated can run with the entire input feature map and output feature map of the operator in the storage using an amount of storage that is less than a maximum size of feature map data that will be stored during processing by operators that cannot form part of a cascade and are to be processed with the entire input feature map and output feature map of the respective operator in the storage. The method may comprise determining a second condition of whether a sequence of operators within the cascade currently being formed having a lowest storage requirement can run using an amount of storage that is less than a maximum size of feature map data that will be stored during processing by operators that cannot form part of a cascade and are to be processed with the entire input feature map and output feature map of the respective operator in the storage. In a case that the method determines that both the first and second conditions are satisfied, the method may designate operators in the sequence of operators within the cascade currently being formed having a lowest storage requirement as a cascade. The method may resume from the next operator. The sequence of operators within the cascade currently being formed having the lowest storage requirement is a sequence of operators with the lowest storage requirement seen so far starting at the same operator as a starting operator of the current cascade being evaluated.

Designating an operator may comprise comparing a) a size of feature map data that will be stored when processing a cascade currently being formed including the operator to be designated with b) a sequence of operators within the cascade currently being formed having a lowest storage requirement.

In such methods, in a case that a size of feature map data that will be stored when processing a cascade currently being formed including the operator is equal to or greater than the maximum size of a sequence of operators within the cascade currently being formed having a lowest storage requirement, the method may reduce the size of the current cascade. The method may reduce the size of the current cascade by forming a cascade with the sequence of operators within the cascade currently being formed having the lowest storage requirement. The method may resume sequentially from the operator following the newly formed cascade.

In such methods, in a case that a size of feature map data that will be stored when processing a cascade currently being formed including the operator is equal to or greater than the size of data required to process a sequence of operators within the cascade currently being formed having a lowest storage requirement, the method may designate the cascade currently being formed to be a sequence of operators with the lowest memory requirement. This may occur in cases in which it is not possible to reduce the size of the current cascade without increasing the minimum storage requirement for processing the neural network.

In a case that a size of feature map data that will be stored when processing a cascade currently being formed including the operator is less than or equal to the size of data required to process a sequence of operators within the cascade currently being formed having a lowest storage requirement, the method may comprise designating the operator as a member of a cascade that is currently being formed.

The method may comprise the information processing apparatus processing the neural network, wherein the neural network is processed using the linear sequence of operators such that operators that cannot form part of a cascade are processed with the entire input feature map and output feature map of the respective operator in the storage, operators that are designated as part of a cascade are used to process their respective input feature maps in portions, and operators that could form part of a cascade and are designated as an operator to be processed with the entire input feature map and output feature map of the operator in the storage are processed with the entire input feature map and output feature map of the operator in the storage.

The method may be a compilation method. The method may be performed by an offline compiler executed by the information processing apparatus or another information processing apparatus subsequent to training of the neural network. In other embodiments, the method may be performed by an online compiler executed by the information processing apparatus.

Identifying operators in the linear sequence of operators that cannot form part of a cascade may comprise comparing a kernel size of an operator to be designated with a size of the input feature map for the operator. Identifying operators in the linear sequence of operators that cannot form part of a cascade may comprise determining dependencies within the neural network to identify operators whose output feature maps need to be accessed by a plurality of subsequent operators in the representation of the neural network as a linear sequence of operators.

According to a second embodiment there is provided an information processing system comprising: a processor; and a first storage storing instructions for performing a method for reducing storage usage of a second storage during processing of a neural network performed by an information processing apparatus, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the second storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the second storage.

According to a third embodiment there is provided a non-transitory computer readable storage medium storing instructions, that when executed by a processor, cause the processor to perform a method for reducing storage usage during processing of a neural network, wherein the neural network may be represented by a plurality of operators each of which operates on an input feature map and generates an output feature map, the method comprising: generating a representation of the neural network as a linear sequence of operators; identifying operators in the linear sequence of operators that cannot form part of a cascade and are to be processed with the entire input feature map and output feature map of the respective operator in the storage; forming one or more cascades of two or more successive operators in the linear sequence for which the input feature map of each operator of the cascade is processed in portions, which portions are less than the entire input feature map, wherein the method forms the one or more cascades by sequentially, from one end of the linear sequence of operators, designating each operator that could form part of a cascade as a member of a cascade or as an operator to be processed with the entire input feature map and output feature map of the operator in the storage.

Particular embodiments are now described with reference to the figures.

FIG. 1 is a schematic diagram showing stages of a method for processing of a neural network by an information processing system. In a first step, 10, a neural network is developed. The purpose of the neural network does not matter and could be image recognition, time-series predictions such as weather forecasting, anomaly detection or any other application. Development of the neural network will typically involve selecting hyper-parameters of the neural network and training the neural network on a data set in order to generate a neural network having a series of layers, each layer associated with trained operators that take a first set of data, referred to as a input feature map, and after processing output a second data set, referred to as an output feature map.

The neural network will be used for inference in step 12 in which an input feature map is input to the neural network and an output of the neural network will be obtained at an output layer. The inference processing will be performed by a processing unit, such as a neural processing unit (NPU) or central processing unit (CPU). Before the neural network is processed by the processing unit in step 12, the neural network is compiled in order to generate a set of instructions for the processing unit to execute when processing the neural network. Compilation in step 11 may involve a number of steps to compress the neural network and optimize the neural network for processing. These steps could include weight pruning, in which weight values that have low importance in the neural network are removed, and weight quantization, which reduces the memory required to hold the weight values by rounding the weight values. The methods described below take place at the compilation step 11 and determine how to process the neural network within peak memory use constraints.

Figure 2:
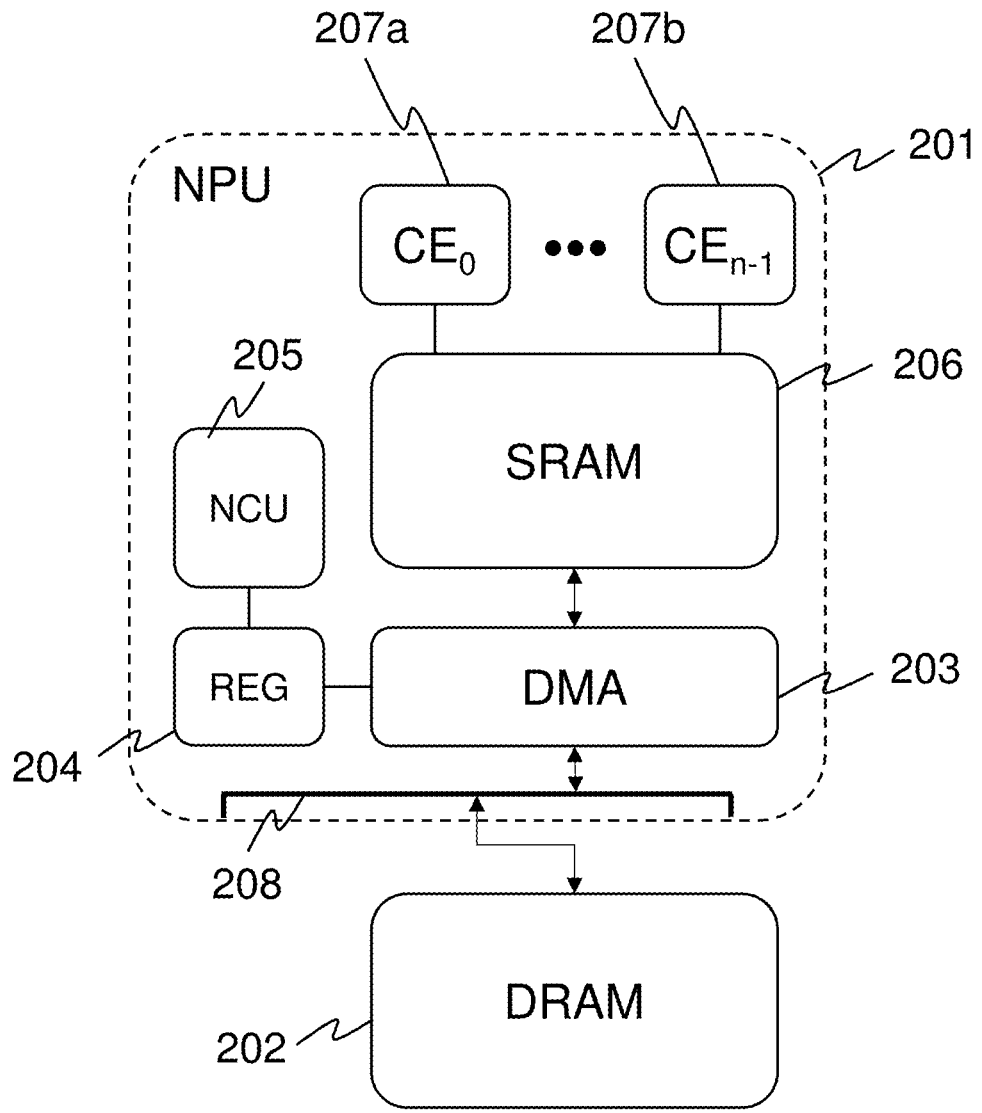
FIG. 2 illustrates a schematic block diagram representing a data processing system.

FIG. 2 illustrates a schematic block diagram representing a data processing system including an NPU and external storage circuitry. The data processing system has external storage circuitry which is DRAM 202. The DRAM 202 is used to store feature map data and other data associated with the neural network such as weight data and instructions. The feature map data may be input feature maps (IFM), output feature maps (OFM), input feature map stripes, and output feature map stripes. The DRAM 202 is connected to the NPU 201 by a data transfer interface such as system bus 208. The NPU 201 comprises a DMA 203 which is connected to the DRAM 202 via the system bus 208 and SRAM 206 via a main data channel. The DMA 203 facilitates the reading and writing of data between the external DRAM 202 and SRAM 206. The SRAM 206 is used to store feature map data in the form of IFM stripes to be processed and OFM stripes after processing and other data associated with processing such as weight data, activation functions and pooling operations. The DMA also has a register 204 which can be set by a neural control unit (NCU) 205. The register 204 comprises a memory address register, byte count register and one or more control registers which are used to specify the source, destination, direction and the amount of the data transfer. The NCU generates control data for the hardware components of the NPU 201, such as the DMA 203 and compute engines 207a, 207b. In examples, other types of processing circuitry are used in place of the NCU, such as a CPU or GPU. The SRAM 206 is connected to a plurality of compute engines 207a, 207b. The compute engines 207a, 207b comprise multiply accumulate (MAC) compute engines (MCE) and programmable layer engines (PLE). MCEs are configured to perform convolutions between an IFM and weight data to generate an OFM. These convolutions may be broken down into IFM stripes and convolved with weight data to generate OFM stripes as discussed further below. PLEs are arranged to perform additional processing operations of the IFM, OFM, IFM stripes or OFM stripes including pool operations and applying activation functions. The PLE can also be programmed to perform a number of operations on different layers of the CNN, allowing for a broad range of CNN architectures to be implemented. In examples, the data processing system is configured for parallel processing. The SRAM 206 is configured to transfer feature map data for processing from a plurality of data buffers equal to the number of compute engines 207a, 207b with the DMA 203 configured to transfer the data to the plurality of data buffers.

Figure 3:
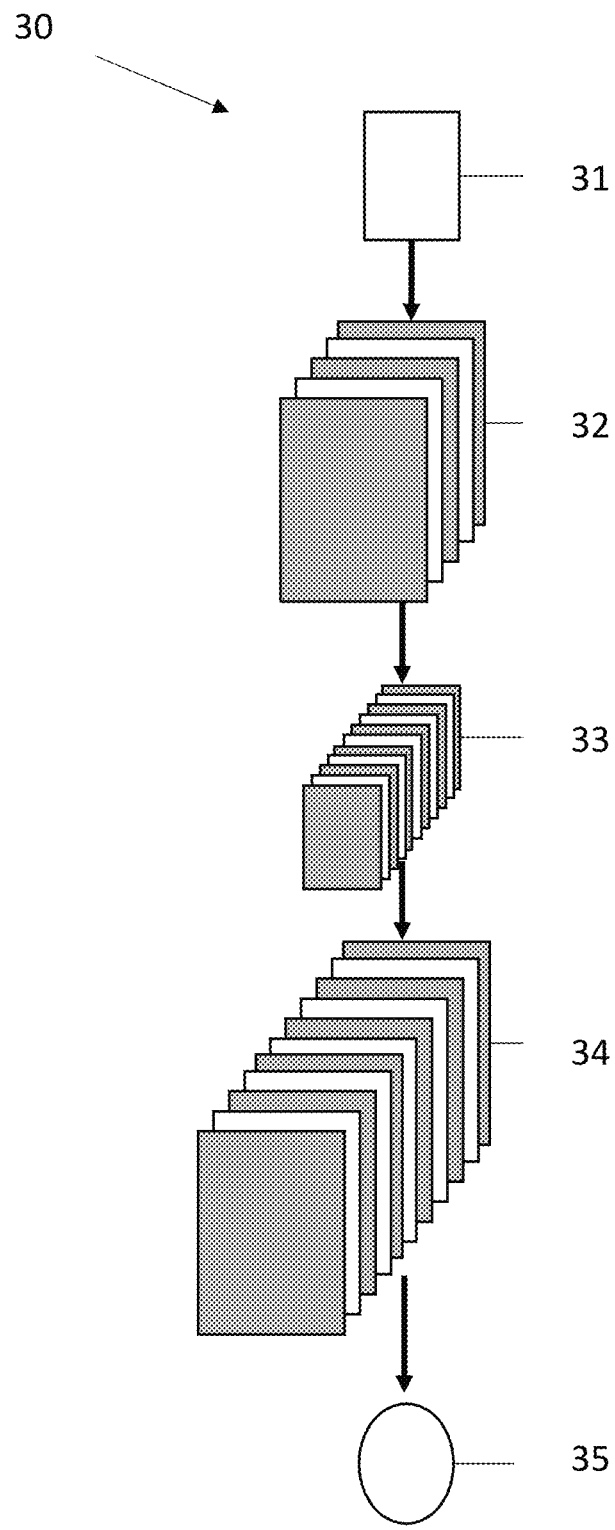
FIG. 3 is a schematic diagram showing stages of processing of a neural network.

FIG. 3 is a schematic diagram showing stages of processing of a neural network 30. An input tensor is received at input layer 31, and is processed through multiple hidden layers 32, 33 and 34. Each layer is made up of a given number of nodes—this number of nodes is referred to as the size of the layer in question. At each layer, operators comprising a set of filters are applied to values in the preceding layer to generate, for convolution layers, one or more feature maps. These filters may consist of a variety of operations, including but not limited to convolutional operations and pooling operation. Depending on the filter applied, each layer will have different processing requirements. Once all the layers 32, 33 and 34 have been passed through, an output 35 is generated.

In the first layer 31, a first operator comprising a first set of filters is applied to the input tensor to generate one or more output feature maps. At each subsequent layer 32, 33 and 34, the filters of that layer act on the feature maps generated from the previous layer. These feature maps are comprised of data, the amount of which may exceed a local memory capacity of the SRAM 206, meaning that at each layer 32, 33 and 34 the data that makes up the feature map from the previous layer may need to be read from an external memory in the form of DRAM 202. For some smaller layers it may be possible to process the layer using the SRAM 206 without making use of the DRAM 202, however filters for the layer will likely need to be fetched from DRAM 202. Once the filters of the current layer have been applied, the data making up the feature map generated by that layer is then written to the DRAM 202 in turn, if the layer is too large to be stored using SRAM 206. Depending on the size of the feature map generated, the read and write operations associated with each layer will take a certain amount of time. Typically, for large layers, data will be streamed—that is, the data will be fetched, processed, and potentially written out, continuously.

Figure 4A:
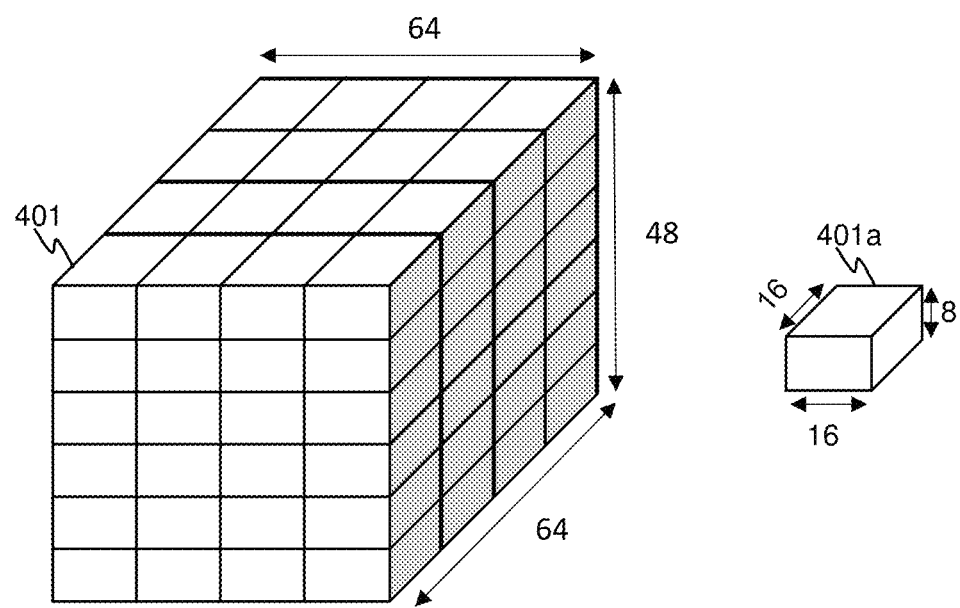
FIG. 4a is a schematic diagram showing a feature map.
Figure 4B:
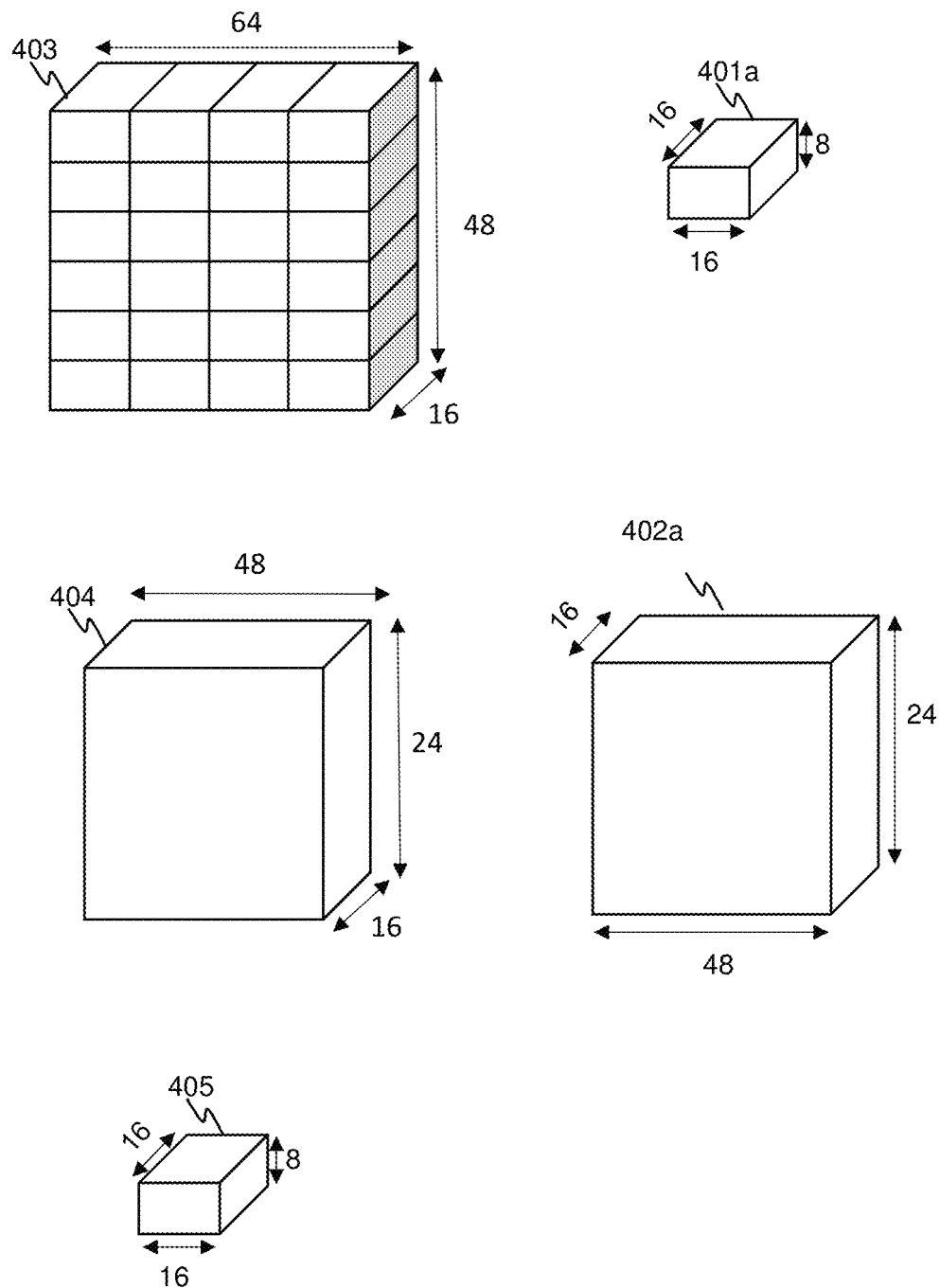
FIG. 4b is a diagram that illustrates cascading of operators.

FIG. 4a is a schematic diagram showing a feature map 401. The input feature map for an operator in a hidden layer of the neural network will be the output feature map of the preceding layer of the neural network. Accordingly, FIG. 4a can be seen to represent an IFM or an OFM. In the example shown, the layer has dimensions (H×W×C) of 48×64×64 where H is height, W is width and C is number of channels or depth. The dimensions of the layers in FIGS. 4a and 4b are for illustration only and the layers may have any suitable dimensions. In the example shown the operator in a layer for which the feature map data in FIG. 4a is an input feature map, the filters of an operator 401a may operate on data in groups of values 8×16×16. In this case, the input feature map could be 'striped' by loading only part of the input feature map into memory. For example, the input feature map could be striped along the width dimension and the data of the input feature map could be processed in four sections of 48×16×64. It can be seen that by loading only part of the input feature map, referred to as a stripe, and applying the operator 401a to that stripe the peak memory required in the SRAM 206 can be reduced compared to loading the entire input feature map 401. For some neural networks, striping may be required to allow the processing of one or more layers of the neural network in the SRAM 206. As runtime processing from SRAM 206 is significantly quicker than obtaining data as needed from DRAM 202, the striping gives a performance uplift.

FIG. 4b is a diagram that illustrates cascading of operators. A first stripe 403 is shown in FIG. 4b which has dimensions 48×16×64 and forms part of the input feature map 401 that is illustrated in FIG. 4a. In a first step of the cascade, the first stripe 403 is loaded into SRAM 206 and operated on by first operator 401a, which requires data in blocks of 8×16×16. The first operator can operate across the stripe 403 to generate an output feature map 404. In this example, the output feature map is smaller than the input feature map (although this does not need to be the case) and has dimensions 24×16×48. In the cascade, a second operator 402a, which requires data having dimensions of 24×16×48 operates on the output feature map 404 to generate an output feature map 405 having dimensions of 8×16×16.

The steps shown in FIG. 4b are referred to as a "cascade" because two or more operators operate on the same stripe of feature map data before moving on to the next stripe of feature map data. As the same stripe of data is operated on by more than one operator, the need to copy data back and forth between the SRAM 206 and DRAM 202 is reduced. In the example shown both operators 401a and 402a operate on stripe of data 403. In order to complete processing of the cascade the two operators would need to sequentially operate on each of the four stripes of the input feature map 401 in order to complete the processing.

In the example above, both operators had kernels with a width of 16 data elements. However, when striping in the width dimension, the width of the kernels of the operators does not need to be the same. Similarly, when striping in the height dimension, the height of the kernels of the operators does not need to be the same. Referring again to the example in FIGS. 4a and 4b, if the second operator had a kernel width of 32 rather than 16, the stripe size could have been selected as 32. In this case, the first operator would do two passes in the width dimension to generate output feature map data having a width of 32 before the second operator could perform a single pass. In this case, the overall input feature map data shown in FIG. 4a would be processed in two stripes.

An algorithm will be now described that determines whether or not an operator should be included in a cascade or not for the purpose of reducing memory allocation. The methods adopt a single-pass approach that takes advantage of the natural reduction in memory usage that occurs from the start-to-finish traversal of most neural network graphs. Allocating the operators to a cascade or to be processed outside of a cascade takes place during the compilation 11, as described in connection with FIG. 1.

When processing a neural network, memory in the SRAM 206 is allocated on a per-operator basis. The memory required for an operator when the input feature map data is not striped is the sum of the entire IFM and OFM size (plus any additional operator specific data). When operators are processed as part of a cascade, this process reduces memory allocation to be the sum of the striped IFM, OFM and intermediate feature maps, such as feature map 404 shown in in FIG. 4b, across multiple operators. As noted above, the use of a cascade can reduce the memory requirements, but at the expense of requiring multiple passes of the operator sequence.

A matter to be resolved when processing a neural network is how to determine when to use operators with full IFM/OFM memory allocations, and when, instead, to create "cascaded" memory allocations across multiple operators. It is possible to determine the minimum peak memory usage using an exhaustive recursive search. This is time consuming and requires excessive resources. An exhaustive search may be viable for an offline compiler, but more restrictive for an online compiler (especially one running in an embedded-systems context).

The methods below are used at compilation of a neural network for the purposes of inference to reduce peak memory usage during processing of a neural network. By reducing the peak memory usage for processing a neural network, the NPU can make use of less memory resources, such as SRAM 206, leaving more resources for other processes that might be using the SRAM 206. This is generally useful but may be particularly useful on embedded systems in which the available hardware resources may be limited.

A neural network may contain one or more non sub-dividable operators. Non sub-dividable operators need to be processed separately and not in combination with other operators in a cascade as described above. There are several reasons why operators may be non sub-dividable, as discussed in more detail below. In a typical use case, the majority of operators will be available for subdividing (processing using striped data in a cascade). However, sub-division varies depending on parameters. For example, a 16×16 IFM with an 8×8 kernel convolution will subdivide because the 8×8 kernel can operate twice using either width-based or height-based subdivision to create the two stripes. On the other hand, a 16×16 IFM with a 16×16 kernel will not subdivide because all the input feature map is required for the kernel.

Two different methods for determining which operators of a neural network to include in a cascade will now be described, a 'bottom-up method' and a 'top-down method'.

Bottom-Up Method

Figure 5:
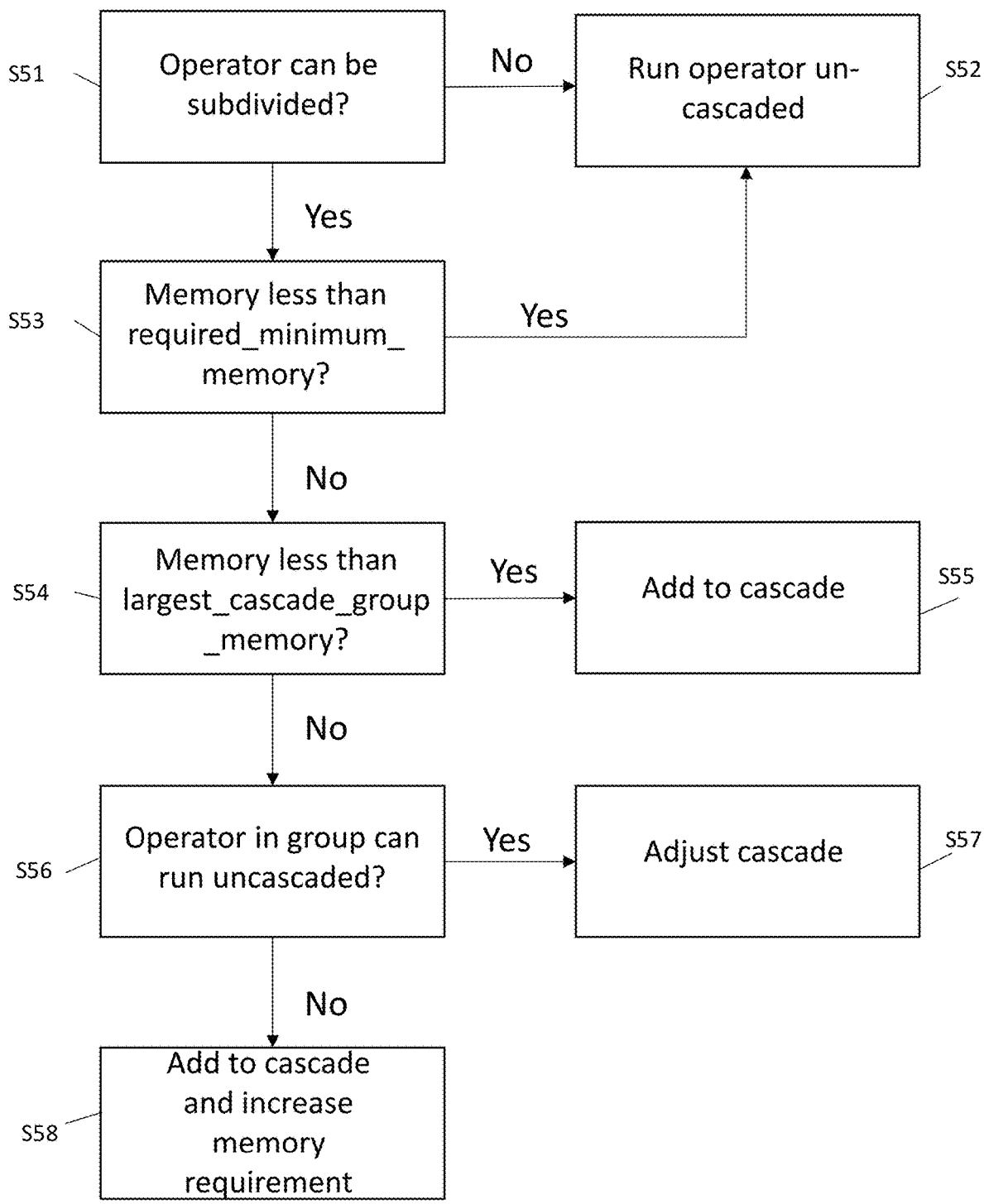
FIG. 5 is a flowchart showing steps in a method of determining whether to cascade operators in a neural network.

FIG. 5 is a flow chart showing heuristic rules for determining whether an operator in a neural network should be included in a cascade.

The bottom-up method operates on a directed acyclic neural network. A first step of the bottom-up method is to linearize the directed acyclic neural network into an execution order of operators. The linearization of the neural network may be performed by representing the neural network as a graph of operators and performing depth-first traversal on the graph. Depth first traversal of a neural network graph involves sequentially searching from each input node in a depth direction until an operator is reached that requires an input feature map data that has not yet been generated or an end of a branch of the graph is reached. The operators in the linear list are labelled to indicate their predecessor dependencies as some operators may require output feature map data from more than one preceding operator.

Following linearization of the neural network, a function "can_subdivide" is used to determine whether an operator can or cannot be subdivided and therefore might not be allowed to participate in a cascade for algorithmic reasons. As mentioned above, a reason that an operator cannot be subdivided might be because the operator requires the entire IFM for its operation. Further reasons will be described further below. Final graph outputs cannot subdivide their OFM.

At a next step, a value required_minimum_memory is determined for the network. This is determined by working out for each operator that the can_subdivide function determined could not be subdivided a value required_minimum_memory=IFM+OFM. That is to say the value required_minimum_memory for an operator is equal to a combined size of the input feature map for the operator and the output feature map of the operator. The required_minimum_memory for the network is equal to the maximum required_minimum_memory of the operators in the network that cannot be sub-divided.

A size of intermediate cascade buffers will be referred to below, which is determined as follows. An intermediate cascade buffer size is, as a minimum, selected so that once the operator's kernel has been applied to the stripe of input feature map data the, now processed, data elements can be used as input feature map data for the next operator. In some implementations, the intermediate buffer may be calculated using a minimum of (kernel_height or kernel_width)+kernel_stride, depending on whether the subdivision direction is horizontal or vertical.

In order to determine or maintain the total memory usage for a cascade of operators the NPU 201 tracks the sum of the cascade IFM, cascade OFM, and all the intermediate buffers.

A value largest_cascade_group_memory is tracked by the NPU 201 which is the maximum of the total memory usage for a single cascade across all cascades that have been identified in the method so far.

With the above pre-requisites in place, a method is provided for determining the required memory as follows:

Starting at the END (output side) of the linearized list of operators that form the neural network, the method works backwards operator-by-operator. If a preceding operator has already been marked as needing to be in an existing cascade list, the method continues to add the current operator to the existing cascade list. Otherwise, the current operator is marked as the start of a new cascade list.

Progressively, for each operator in the linearized list that can be subdivided, the method determines an un-cascaded and cascaded memory requirement for the current operator and adds the operator to the current cascade list, until any of the following prevent it:

a) The current operator's un-cascaded memory requirement is less than any imposed hardware upper memory limit. If the operator can run in the SRAM 206 without striping, there is no efficiency gain in cascading this operator.

b) The current operator's un-cascaded memory requirement is less than required_minimum_memory of the network. If the operator's un-cascaded memory requirement is less than the required_minimum_memory of the network, then the operator can be run uncascaded without increasing the peak memory usage. The current operator can therefore run uncascaded within allocated working memory on the SRAM 206.

c) The operator's un-cascaded memory requirement is less than largest_cascade_group_memory usage so far. Similar to b), if the operator's un-cascaded memory requirement is less than the largest cascade_group_memory so far, then the operator can be run uncascaded without increasing the peak memory usage.

d) The act of adding the current operator to the list for a cascade increases the total memory requirement of the cascade list such that the un-cascaded memory requirement of operators inside the list are less than the total cascade memory (i.e. they can run un-cascaded).

If, due to the above rules, an operator does not end up in the cascade, the method searches the operators in the current cascade list and evicts the operator with the lowest un-cascaded memory requirement. Evicting an operator must split the cascade into usable cascades. If the operator with the lowest un-cascaded memory requirements is one-before the start or end of the cascade list, the method evicts the first or final operator in the cascade list instead.

At this point, the method restarts with the operator after the newly evicted operator. The method marks the start of a NEW cascade with the newly evicted operator and repeats the above sequence.

Each time an operator is added to the cascade, the method marks its predecessor dependencies as needing to be in the same cascade.

Each time an operator is run in full, or removed from a cascade, the method marks its predecessor dependencies as not being in any cascade.

The heuristic rules used in the method described above will now be described more generally with reference to FIG. 5. As explained above, a pre-processing step for this method is to determine whether or not there are operators in the linearized list of operators that need to be processed with a full input feature map. One reason for this indivisibility may be that the operator requires a large enough portion of the input feature map for its filters that the input feature map cannot be subdivided. Other reasons for indivisibility may be to do with the structure of the neural network. This gives rises to the value required_minimum_memory which is the largest memory required by an operator that needs to be processed with a full input feature map.

The method proceeds sequentially from the bottom of the linearized list of operators. For each operator the following steps are performed. At S51, it is determined if the operator is one that cannot be subdivided i.e. it needs to run un-cascaded. If 'yes', the operator is marked to run un-cascaded in S52.

At step S53, the method determines if the memory required to run the operator (i.e. the IFM plus the OFM) is less than the required_minimum_memory described above. If the operator can run un-cascaded within the current minimum memory required by another operator that has to run un-cascaded, there is no peak memory saving in cascading the operator and the operator is marked to run un-cascaded in step S52.

At step S54, the method determines whether the memory of the current cascade, if the operator is added to the cascade, will be greater than or equal to the value largest_cascade_group_memory, which represents the largest memory required by a cascade so far in the method. If adding the operator to the current cascade will not cause the cascade to become the cascade with the largest memory requirement so far, the operator is added to the cascade in step S55.

If the addition of the operator to the current cascade will cause the cascade to become the cascade with the largest memory requirement, in step S56 it is determined whether the cascade can be modified in step S57 by evicting from the cascade the operator with the lowest un-cascaded memory requirement. Evicting an operator tends to split the cascade into two usable cascades. If the smallest operator is one-before the start or end of the cascade list, the method evicts the first or final operator in the cascade list instead.

If it is not possible to split the cascade or evict an operator from the cascade, perhaps because evicting the operator would increase the memory use more than adding the operator to the cascade, the operator is added to the cascade in step S58 and the value largest_cascade_group_memory is increased to correspond to the new cascade size.

Figure 6A:
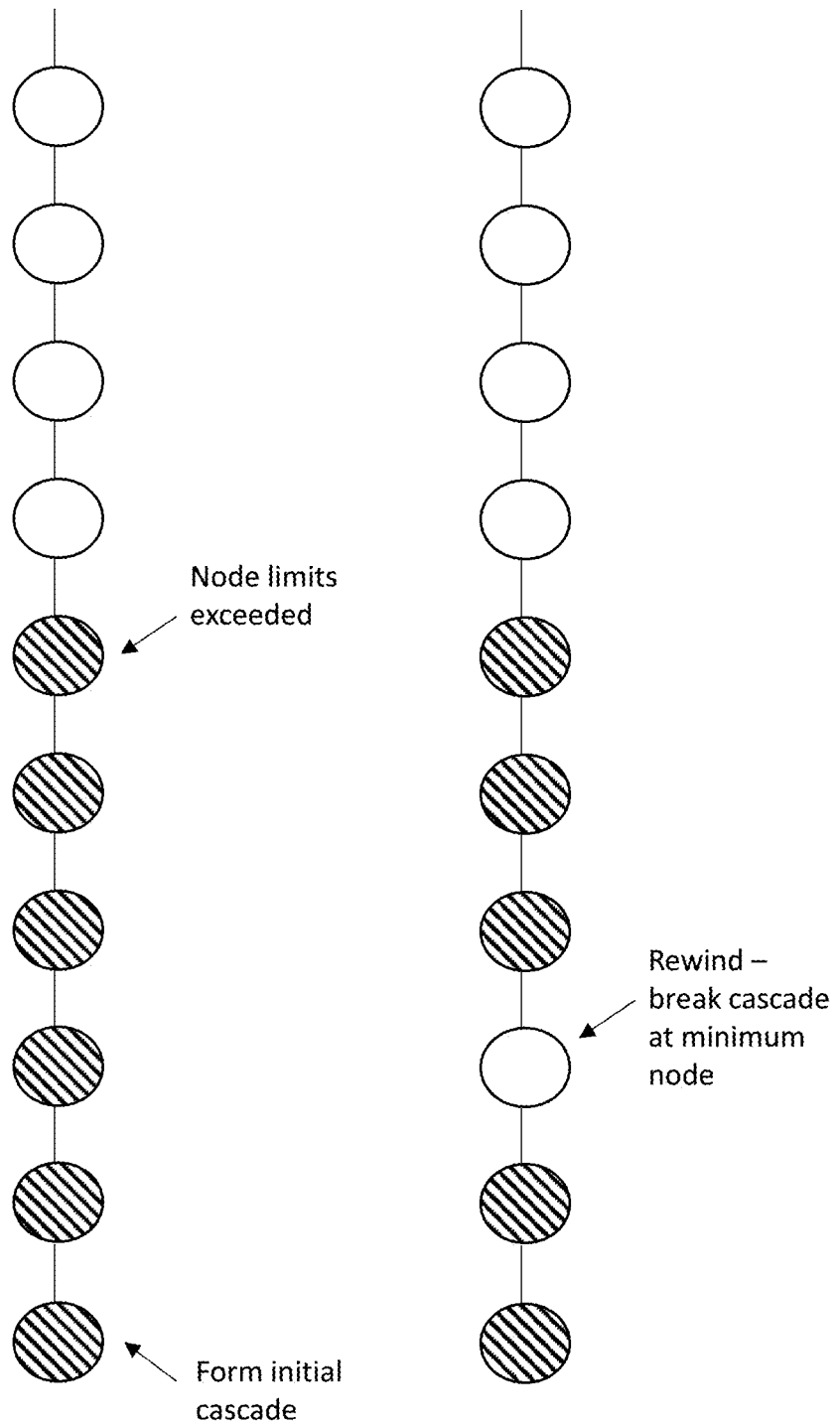
FIGS. 6a and 6b illustrate linear sequences of operators that are grouped into cascades in accordance with a bottom-up method.
Figure 6B:
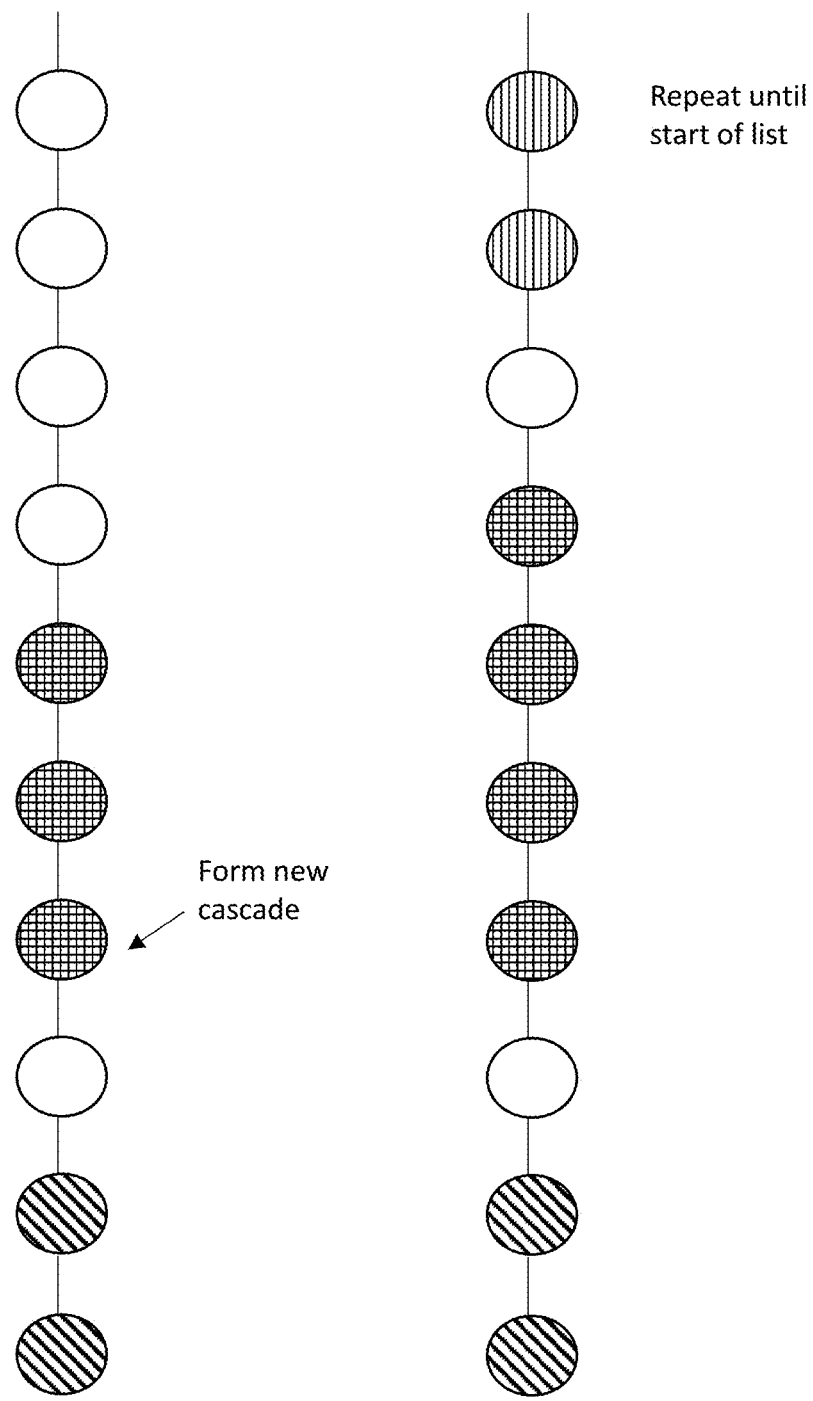

FIGS. 6*a* and 6*b* illustrate steps in the above-described method applied to a sample sequence of neural network operators. On the left-side of FIG. 6*a*, processing from the bottom (end) of the sequence of operators is illustrated. Operators are sequentially added to a first cascade from the bottom of the cascade, shown with hatching, until eventually a memory limit is exceeded. In this example, the act of adding the sixth operator to the list for a cascade increases the total memory requirement of the cascade list such that the un-cascaded memory requirement of at least one of the operators inside the list is less than the total cascade memory. The right-side sequence of operators shown in FIG. 6*a* shows that the method now rewinds to find the operator in the cascade with the lowest un-cascaded memory requirement. This operator is then set to run un-cascaded. The first two operators in the sequence form a first cascade.

The left-side sequence shown in FIG. 6*b* shows that a new cascade is formed at the fourth operator and the method proceeds from there, sequentially adding operators to a second cascade. This process is repeated using the same method, operator-by-operator, until the sequence of operators has been traversed. The right-side sequence shown in FIG. 2*b* shows a resulting sequence including three cascades.

Top-Down Method

A top-down method will now be described that is a method of designating operators as part of a cascade that works from the first operator in the linearized sequence to the last operator in the sequence.

As with the 'bottom-up method', the first step is to linearize a directed acyclic neural network to form a list of operators in an execution order. As before, the linearization of the neural network may be performed by representing the neural network as a graph of operators and performing depth-first traversal on the graph. A 'can_subdivide' function is provided that determines whether or not an operator can or cannot be subdivided and therefore might not be allowed to participate in a cascade for algorithmic reasons. As described above and further below, the can_subdivide function applies logic that determines whether or not an operator can form part of a cascade. An operator may be unable to form part of a cascade if it requires an input feature map that is not consistent with it forming part of a cascade i.e. the input feature map data cannot be striped. An operator may also be unable to form part of a cascade due to dependencies within the neural network (branching structure) as will be described in more detail further below.

At a next step, a value required_minimum_memory is determined for the network. This is determined by working out for each operator that the can_subdivide function determined could not be subdivided a value required_minimum_memory=IFM+OFM. That is to say the value required_minimum_memory for an operator is equal to a combined size of the input feature map for the operator and the output feature map of the operator. The required_minimum_memory for the network is equal to the maximum required_minimum_memory of the operators in the network that cannot be sub-divided.

The method then operates by iterating operator-by-operator starting at the top of the linearized list. The first operator for this method is an operator that consumes a graph input.

If a first operator can be subdivided the method marks the start of a cascade. Otherwise the first operator has to be run un-cascaded.

Throughout the method keeps track of the memory requirement of two cascades:
1. The cascade with the lowest memory requirement, initially this will be the first operator un-cascaded. Tracking this cascade with the lowest memory requirement is alternative way of evicting the correct operator described in connection with the bottom-up implementation.
2. The cascade that covers all operators so far added to the cascade.

Progressively the method takes each operator that consumes the previous operator's OFM and can be subdivided. The method determines, for a current operator, the un-cascaded memory requirements and an impact of adding the operator to the current cascade on the current cascade's memory requirements. Operators are added to the current cascade until any of the below conditions are met:
1. The current operator's un-cascaded memory requirement is less than any imposed hardware upper memory limit. As before, if the operator can be run un-cascaded in the SRAM 206, there is no benefit in striping the input feature map data.
2. The current operator's un-cascaded memory requirement and the cascade with the lowest memory requirement are less than required_minimum_memory. In this case, by breaking the preceding cascade, the current operator can be run un-cascaded and the preceding cascade can be run within the required_minimum_memory without increasing peak memory usage.
3. The memory requirement of the accumulated size of the cascade's buffers exceed the memory required for the cascade with the lowest memory requirement. In this case, the cascade's memory is increasing due to addition of the operator and rewinding will allow a cascade with a lower memory requirement to be formed.

If any of conditions above are true, the method rewinds to the operator after the last operator of the lowest memory requirement cascade (the cascade that is being tracked in 1. above) and the method marks the start of a new cascade.

The method assigns a current cascade as the lowest memory requirement cascade if the sum of the additional buffers and most recent operator's OFM requires less memory than the OFM of the current lowest memory requirement cascade.

Figure 7:
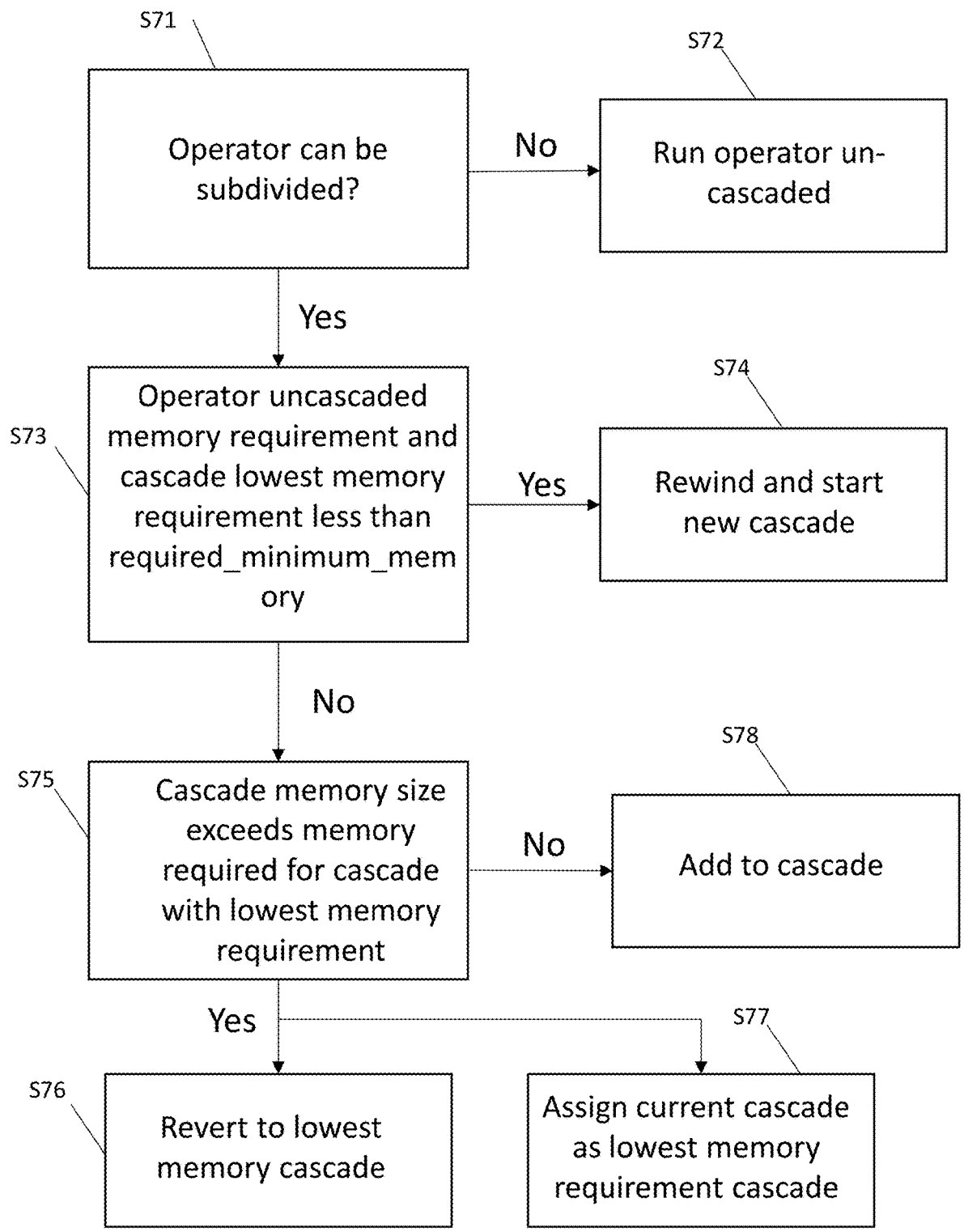
FIG. 7 is a flowchart showing steps in a method of determining whether to cascade operators.

Logic applied in this method will be described more generally with reference to FIG. 7.

The method proceeds sequentially from the top of the linearized list of operators. For each operator the following steps are performed. At S71, it is determined if the operator is one that cannot be subdivided i.e. it needs to run un-cascaded. If 'yes', the operator is marked to run un-cascaded in S72.

If the operator can be subdivided, at step S72 it is determined whether the un-cascaded memory requirement and the cascade lowest memory requirement are less than the required_minimum_memory. In this case, the method moves to step S74. The method rewinds to the operator after the end of the cascade with the lowest memory requirement, which is being tracked. The method then proceeds again from that operator. In this way, a complete cascade is formed and a new cascade starts that includes an operator that can run un-cascaded. Alternatively, the only operator in the cascade is the current operator that has an un-cascaded memory requirement that is less than required_minimum_memory and the current operator is set to run uncascaded.

In step S75, it is determined if the cascade memory size exceeds memory required for the cascade with the lowest memory requirement. If the cascade memory size does not exceed memory required for the cascade with the lowest memory requirement, the operator is added to the cascade in S78.

If, in step S75, the cascade memory size exceeds the memory required for the cascade with the lowest memory requirement, the memory requirement for the current cascade is increasing. If the lowest memory requirement cascade, that is being tracked in connection with the current cascade, is lower than the memory requirement of the cascade including the operator currently being considered, the method rewinds at S76 to the operator after the end of the cascade with the lowest memory requirement. The method then proceeds again from the operator after that cascade with a new cascade. If appropriate, the method sets the required_minimum_memory to a value of the newly set cascade. On the other hand, if the lowest memory requirement cascade is the current cascade including the operator currently being considered, then the method proceeds to step S77. At step S77, the operator is added to the cascade and the current cascade is designated as the lowest memory requirement cascade.

Figure 8A:
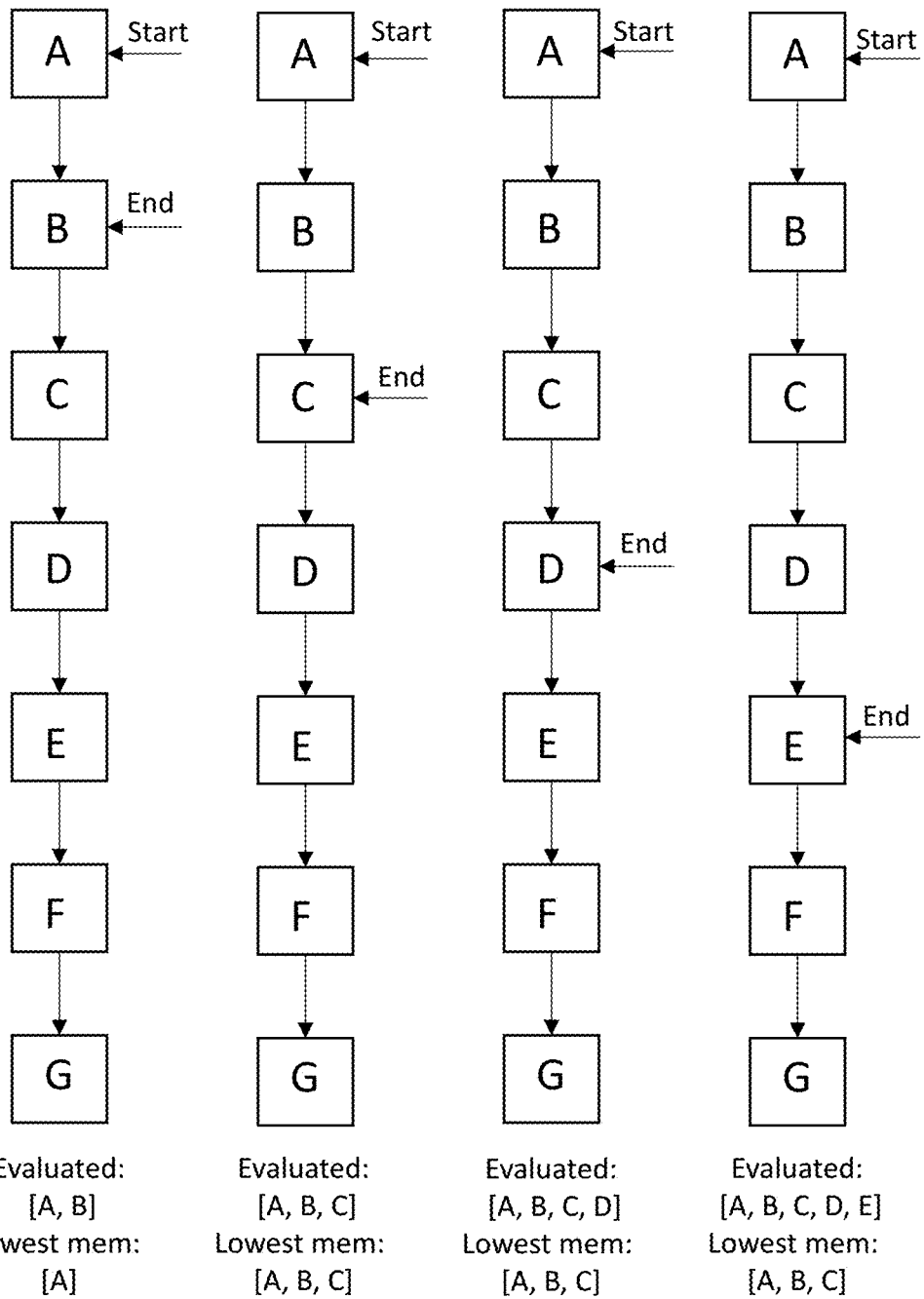
FIGS. 8a and 8b show a diagram illustrating a method of determining whether to cascade operators according to a top-down method.
Figure 8B:
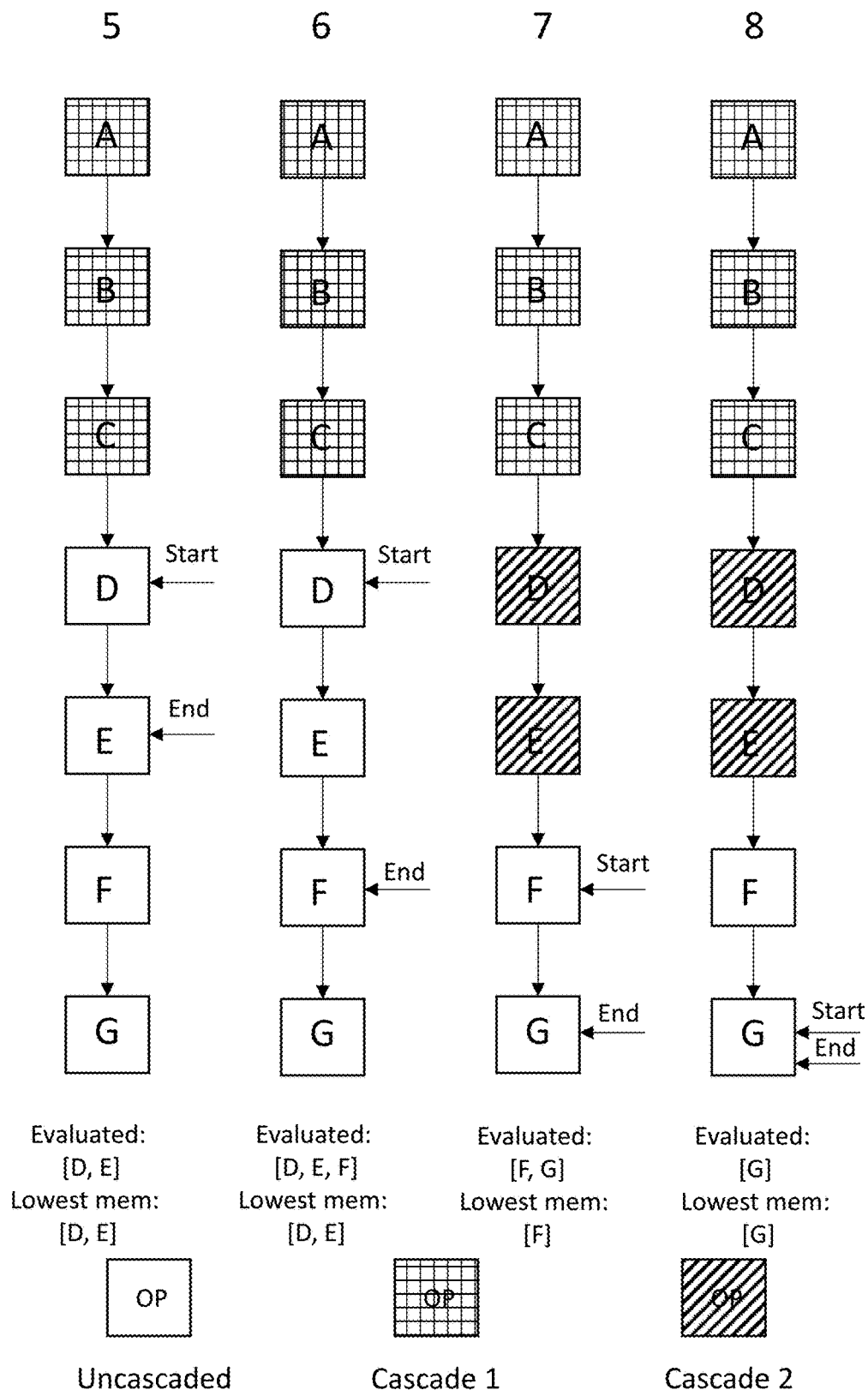

FIGS. 8a and 8b illustrates the above-described top-down method applied to a sequence of operators A to G. In the example it is assumed that all operators can be subdivided and therefore cascaded. The method is shown sequentially in time with the method moving between sequences labelled 1 to 8 shown in the figures in order.

As shown in FIGS. 8a and 8b, the 'Evaluated' cascade is the cascade that is currently being evaluated and is also marked with start and end arrows.

The 'Lowest mem' cascade shown in FIGS. 8a and 8b is the cascade with the lowest memory requirement seen so far starting at the same operator that the current cascade being evaluated. This is the cascade that will be assigned when any of the conditions to stop cascade evaluation are met. The memory requirement is calculated as: Full IFM of the first operator in the cascade+Full OFM of the last operator in the cascade+accumulated size of all intermediate buffers that are required in between the operators in the cascade A minimum memory limit in the form of required_minimum_memory is determined as the maximum of the largest cascade created (and assigned) so far and the largest memory requirement for any operator that cannot be subdivided.

To start the top-down method the first operator A is evaluated. In the example shown, operator A is first considered and that operator is found to have an un-cascaded memory size that is greater than the value required_minimum_memory. The operator A can run cascaded within the value required_minimum_memory. Accordingly, the operator A is marked to run in a cascade and the cascaded memory size is determined to be the same as the memory required for the cascade with the lowest memory requirement, which in this case in simply the operator A.

In the first sequence illustrated in FIG. 8a, labelled '1', the first two operators are evaluated in a cascade. Operator A by itself requires less memory than A and B in the cascade. Neither operator A nor operator B have uncascaded memory requirements within the value required_minimum_memory. Accordingly, the operator B is added to the cascade.

In sequence 2, operators A, B and C are evaluated in a cascade. The evaluated cascade requires less memory than A by itself, so this cascade becomes the new lowest mem cascade. None of operators A to C have uncascaded memory requirements within the value required_minimum_memory. Accordingly, the operator C is added to the cascade.

In sequence 3 including D in the cascade does not change the memory footprint, so the lowest memory cascade remains [A, B, C]. None of operators A to D have uncascaded memory requirements within the value required_minimum_memory. Accordingly, the operator D is added to the cascade.

In sequence 4, including E in the cascade increases the memory footprint of the cascade. At this point the IFM of A, i.e. the initial input of the cascades being evaluated (that needs to be stored full sized in memory) and the accumulated size of all the buffers in between operators A through E have exceeded the size of the lowest memory cascade of [A, B, C]. Accordingly, as explained in connection with S75, the operator E is not assigned to the cascade. The method assigns the lowest memory cascade as a complete cascade and increases the minimum memory limit to the size of this cascade (if it is larger than required_minimum_memory). The method rewinds to operator D and start a new cascade there.

Referring now to FIG. 8b, in the Sequence 5 shown on the left-hand side, operators D and E in a cascade require less memory than operator D by itself (uncascaded). Neither operator D nor operator E have uncascaded memory requirements within the updated value required_minimum_memory.

In Sequence 6, operators D and E in a cascade have a memory requirement that is less than required_minimum_memory. Operator F can be run uncascaded within the memory limit set by required_minimum_memory. Accordingly, the method assigns the lowest memory cascade [D, E] as a complete cascade. The method rewinds to operator F and starts a new cascade there.

In sequence 7, both operators F and G have uncascaded memory requirements that are less than required_minimum_memory. The method assigns F as the lowest mem cascade, resulting in F being run uncascaded. The method rewinds to operator G and starts a new cascade there.

In sequence 8, operator G is the last operator in the graph and cannot be run cascaded.

Treatment of Branches

The following explanation relates to the bottom-up method. As explained in connection with that method, each time an operator is added to the cascade, the method marks its predecessor dependencies as needing to be in the same cascade. Each time an operator is run in full, or removed from a cascade, the method marks its predecessor dependencies as not being in any cascade.

Figure 9:
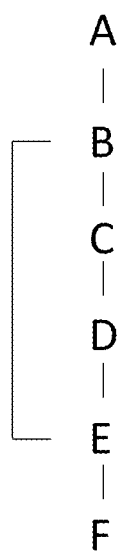
FIG. 9 is an illustration of a linear series of operators that shows dependencies between operators.

Given a graph layout shown in FIG. 9, where "A" is full input, and "F" is full output. Placing "E" into a cascade would cause the method to mark "B" and "D" as needing to be in the same cascade as "E". "B" now has the option of not being in any cascade OR being in the same cascade as "E"—it cannot be in a different cascade to "E".

If "C" ended up un-cascaded, or "C" ended up in a different cascade (unlikely here because there aren't enough nodes) it would update the mark on "B". This could conflict with the cascade dependency that "E" marked operator "B" with. If an operator is marked with two cascades, such as in the example "B", then "B" must be un-cascaded so that both branches have access to B's output feature map. If the method evicts a node from a cascade, the next cascade built from that point would have a different identifier, so when we reach a dependency that's been pre-marked for another cascade, they'll differ and that operator will be forced to be processed un-cascaded.

The function 'can_subdivide' described above may use this type of logic on branches of the neural network along with an examination of the size of the input feature maps required by the operators in order to determine which operators cannot be subdivided.

In Use

Once a linear sequence of operators has been generated in which operators have been designated to run in cascades or not as described above, the compilation process may continue to generate instructions for executing the neural network that are suitable for processing by a processing unit, such as NPU 201.

In step 12 described above, the NPU 201 may execute the neural network based on the compiled instructions and data of an input feature map. During processing of the neural network, the IFM data may be read from the DRAM 202 and OFM written to the DRAM 202 based on the compiled instructions. In particular, operators that have been marked as un sub-dividable are processed separately with their input feature map loaded completely. Further any operators that are sub-dividable but have been designated to run un sub-divided are also run with their input feature maps loaded completely. Neither of these types of operators are run using striping of data as described above. For operators that are designated as forming part of a cascade, these operators are run using striped data to reduce memory usage. As explained above in connection with FIGS. 4a and 4b the striping pattern is determined based on kernel size of the operators in the cascasde.

In this way, the peak memory usage and therefore the maximum SRAM memory allocation required to process a neural network can be managed.

CONCLUSION

A fully exhaustive search technique of different operators in and out of cascades will find the optimum assignment of operators in and out of cascades to minimize peak memory usage. The above implementations concern finding an optimum or satisfactory sequence of operators with indications of which operators should be run in a cascade or out of a cascade without having to conduct the exhaustive search. In the case of the top-down implementation, the method allows determination of a sequence of operators in a single pass.

In terms of efficiency, the bottom-up approach is provably in the order of $N^2/2$ where N is the number of operators. That is to say that the number of operators required to complete the method increases with the square of the number of operators. The top-down approach closer to in the order of N, which is to say that the number of operations increases linearly with an increase in the number of operators. Performing an exhaustive search is slower, likely in excess of in the order of $N^2$ and probably closer to the order of $N!$. That is to say that the number of operations required by an exhaustive search increases at least with the square of the number of operators and may be less efficient than that.

In essence the above methods trade the full-coverage of exhaustive searches for a controllable directed search because it's more useful to have that control. Reducing runtime is possible using these methods.

Existing techniques for optimizing the processing of neural networks include quantization and weight pruning. These existing techniques work by changing the calculations performed by the neural network and reducing the number of constant values. In the context of the hardware these do very little to reduce the runtime memory footprint. Instead the methods above preserve the mathematical equivalence and try to reduce the "live" memory footprint.

What is claimed is:

1. A method, performed by an information processing system comprising a first information processing apparatus and a second information processing apparatus comprising a storage and a processor, for reducing storage usage during processing of a neural network performed by the second information processing apparatus, wherein the neural network may be represented by a plurality of operators each of which operates on an input feature map and generates an output feature map, the method comprising:
   generating, by the first information processing apparatus, a representation of the neural network as a linear sequence of operators;
   identifying, by the first information processing apparatus, operators in the linear sequence of operators that cannot form part of a cascade and are to be processed with the entire input feature map and output feature map of the respective operator in the storage;
   forming, by the first information processing apparatus, one or more cascades of two or more successive operators in the linear sequence for which the input feature map of each operator of the cascade is processed in portions, which portions are less than the entire input feature map,
   wherein the method forms the one or more cascades by sequentially, from one end of the linear sequence of operators, designating each operator that could form part of a cascade as a member of a cascade or as an operator to be processed with the entire input feature map and output feature map of the operator in the storage;
   generating, by the first information processing apparatus, instructions for executing the neural network including the designations of the operators;
   executing, by the processor of the second information processing apparatus, the instructions so that operators designated to be processed with the entire feature map are processed with their respective feature map loaded completely in the storage; and
   sequentially executing, by the processor of the second information processing apparatus, the two or more operators that are designated as part of a cascade with a portion of the entire feature map that is less than the entire feature map loaded in the storage before processing a further portion of the entire feature map.

2. The method according to claim 1, wherein the method forms the one or more cascades by sequentially, from an output end of the linear sequence of operators, designating each operator that could form part of a cascade as a member of a cascade or as an operator to be processed with the entire input feature map and output feature map of the operator in the storage.

3. The method according to claim 2, wherein designating an operator includes comparing a size of feature map data that will be stored in the storage when processing a cascade including the operator with a maximum size of feature map data of one or more other cascades.

4. The method according to claim 3, wherein the size of the feature map data that will be stored when processing a cascade is determined based on a size of an input feature map for the first operator in the cascade, sizes of intermediate feature maps for any subsequent operators in the cascade that are not the last operator in the cascade, and a size of an output feature map for the last operator in the cascade.

5. The method according to claim 3, wherein in a case that the size of feature map data that will be stored when processing a cascade including the operator is greater than or equal to a maximum size of feature map data of one or more other cascades, the method reduces the size of the current cascade in order to keep the memory size below the maximum size of feature map data of another cascade of the one or more cascades.

6. The method according to claim 5, wherein the method reduces the size of the current cascade by at least one of: removing an operator from the cascade and designating the removed operator to be processed with the entire input feature map and output feature map of the removed operator in the storage, and splitting the cascade into two or more cascades.

7. The method according to claim 2, wherein designating an operator includes comparing a size of feature map data that will be stored when processing a cascade including the operator with a maximum size of feature map data that will be stored during processing by operators that cannot form part of a cascade and are to be processed with the entire input feature map and output feature map of the respective operator in the storage.

8. The method according to claim 1, wherein the one or more cascades are formed by sequentially, from an input end of the linear sequence of operators, designating each operator that could form part of a cascade as a member of a cascade or as an operator to be processed with the entire input feature map and output feature map of the operator in the storage.

9. The method according to claim 8 further comprising:
determining a first condition of whether an operator being designated can run with the entire input feature map and output feature map of the operator being designated in the storage using an amount of storage that is less than a maximum size of feature map data that will be stored during processing by operators that cannot form part of a cascade and are to be processed with the entire input feature map and output feature map of the respective operator in the storage;
determining a second condition of whether a sequence of operators within the cascade currently being formed having a lowest storage requirement can run using an amount of storage that is less than a maximum size of feature map data that will be stored during processing by operators that cannot form part of a cascade and are to be processed with the entire input feature map and output feature map of the respective operator in the storage; and
in a case that the method determines that both the first and second conditions are satisfied, the method designating operators in the sequence of operators within the cascade currently being formed having a lowest storage requirement as a cascade.

10. The method according to claim 8, wherein designating an operator comprises comparing a size of feature map data that will be stored when processing a cascade currently being formed including the operator to be designated with a sequence of operators within the cascade currently being formed having a lowest storage requirement.

11. The method according to claim 1, wherein operators that could form part of a cascade and are designated as an operator to be processed with the entire input feature map and output feature map of the operator in the storage are processed with the entire input feature map and output feature map of the operator in the storage.

12. The method according to claim 1, wherein the first information processing apparatus is an offline compiler.

13. The method according to claim 1, wherein the first information processing apparatus is an online compiler.

14. An information processing system comprising a first information processing apparatus and a second information processing apparatus, the first information processing apparatus comprising:
a first processor; and
a first storage storing instructions for performing a method for reducing storage usage of a second storage during processing of a neural network performed by a second information processing apparatus, wherein the neural network may be represented by a plurality of operators each of which operates on an input feature map and generates an output feature map, the method comprising:
generating a representation of the neural network as a linear sequence of operators;
identifying operators in the linear sequence of operators that cannot form part of a cascade and are to be processed with the entire input feature map and output feature map of the respective operator in the second storage;
forming one or more cascades of two or more successive operators in the linear sequence for which the input feature map of each operator of the cascade is processed in portions, which portions are less than the entire input feature map,
wherein the method forms the one or more cascades by sequentially, from one end of the linear sequence of operators, designating each operator that could form part of a cascade as a member of a cascade or as an operator to be processed with the entire input feature map and output feature map of the operator in the second storage; and
generating instructions for executing the neural network including the designations of the operators;
the second information processing apparatus being configured to perform a method comprising:
executing, by the second processor, the instructions so that operators designated to be processed with the entire feature map are processed with their respective feature map loaded completely in the second storage; and
sequentially executing the two or more operators that are designated as part of a cascade, by the second processor, with a portion of the entire feature map that is less than the entire feature map loaded in the storage before processing a further portion of the entire feature map.

15. A non-transitory computer readable storage medium storing instructions, that when executed by an information processing system comprising a first information processing apparatus and a second information processing apparatus comprising a storage and a processor, cause the information processing system to perform a method for reducing storage usage during processing of a neural network, wherein the neural network may be represented by a plurality of operators each of which operates on an input feature map and generates an output feature map, the method comprising:
generating, by the first information processing apparatus, a representation of the neural network as a linear sequence of operators;
identifying, by the first information processing apparatus, operators in the linear sequence of operators that cannot form part of a cascade and are to be processed with the entire input feature map and output feature map of the respective operator in the storage;
forming, by the first information processing apparatus, one or more cascades of two or more successive operators in the linear sequence for which the input feature map of each operator of the cascade is processed in portions, which portions are less than the entire input feature map,
wherein the method forms the one or more cascades by sequentially, from one end of the linear sequence of operators, designating each operator that could form part of a cascade as a member of a cascade or as an operator to be processed with the entire input feature map and output feature map of the operator in the storage;
generating, by the first information processing apparatus instructions for executing the neural network including the designation of the operators;
executing, by the processor of the second information processing apparatus, the instructions so that operators to be processed with the entire feature map are processed with their respective feature map loaded completely in the storage; and sequentially executing, by the processor of the second information processing apparatus, the two or more operators that are designated as part of a cascade with a portion of the entire feature map that is less than the entire feature map loaded in the storage before processing a further portion of the entire feature map.

* * * * *